US005718158A

United States Patent [19]

Rogge

[11] Patent Number: 5,718,158

[45] Date of Patent: Feb. 17, 1998

[54] BAGEL HOLDER

[75] Inventor: Dwaine W. Rogge, Lincoln, Nebr.

[73] Assignee: R.F. Nature Farm Foods, Inc., Lincoln, Nebr.

[21] Appl. No.: 666,005

[22] Filed: Jun. 19, 1996

[51] Int. Cl.[6] .......... B26D 3/30

[52] U.S. Cl. .......... 83/762; 83/454; 83/932; 83/870; 269/295

[58] Field of Search .......... 83/451, 454, 761, 83/762, 763, 764, 765, 870, 932; 269/87.2, 288, 290, 291, 292, 295, 303; D7/673

[56] References Cited

U.S. PATENT DOCUMENTS

| | | | |
|---|---|---|---|
| D. 354,203 | 1/1995 | Naccarato | D7/673 |
| 3,583,026 | 6/1971 | Peoni | 269/87.2 X |
| 4,249,445 | 2/1981 | Browning | 83/762 |
| 4,580,343 | 4/1986 | Bell, Jr. | D7/673 X |
| 4,807,505 | 2/1989 | Campbell et al. | 83/454 |
| 4,948,106 | 8/1990 | Popeil et al. | 83/762 X |
| 5,287,784 | 2/1994 | Brockett | 83/762 |
| 5,431,078 | 7/1995 | Ricard et al. | 83/870 |
| 5,481,953 | 1/1996 | McLeod | 83/932 X |
| 5,611,266 | 3/1997 | Kensrue | 83/454 X |
| 5,638,734 | 6/1997 | Fish | 83/454 X |

*Primary Examiner*—Rinaldi I Rada
*Assistant Examiner*—Clark F. Dexter
*Attorney, Agent, or Firm*—Zarley, McKee, Thomte, Voorhees & Sease; Mark D. Frederiksen

[57] ABSTRACT

A bagel holder includes a housing with an open upper end and a bottom wall which arches upwardly in its center. Forward and rearward walls of the housing slant towards one another from their upper edges to their lower edges to form a general wedge shape therebetween. The housing end walls include parallel upper portions and lower portions which slant towards one another as they extend downwardly to their juncture with the bottom wall. Each end wall includes a vertical slot extending downwardly to a lower end spaced above the bottom wall at a point which is a vertical distance approximately the same as the vertical distance to which the bottom wall is arched upwardly. Each end wall includes a thickened portion forming a buttress pad at the lower end of the slots and formed integrally with the end walls.

12 Claims, 2 Drawing Sheets

10 22 14 18a 16a 18 28 16 30 26 18b 16b 24 18c 16c 20

BAGEL HOLDER

TECHNICAL FIELD

The present invention relates generally to apparatus for holding baked goods for slicing, and more particularly to an improved holder for retaining a bagel or similarly shaped product in position for slicing.

BACKGROUND OF THE INVENTION

Bagels have become an increasingly popular food product throughout the country. In most cases, the bagel is served sliced in half to form two ring-shaped slices with a flat top and toroidal bottom. However, conventional methods for slicing the bagel in half suffer a number of problems.

First, the bagel must be secured while passing the knife through the food product. Holding the bagel with the fingers is the conventional method of cutting a bagel, for a typical consumer. However, certain establishments that sell bagels utilize a method for slicing bagels which is less likely to cause injury.

Because of the likelihood of cutting the fingers while slicing a bagel, a holder was devised for retaining a bagel in position while a knife is used to cut the bagel in half. The prior art holders known to this inventor are generally rectangular boxes having an open upper end permitting the bagel to be inserted in a vertical orientation. A pair of vertical slots formed in the opposing ends of the holder permit the knife to pass downwardly through a majority of the bagel.

However, the prior art bagel holders suffer a number of problems. First, the vertical slots in the end panels of the holder weaken the side panels so that they can be easily broken off of the holder. In addition, the vertical slots can not extend the entire length of the end panels, so that the cut through the bagel does not pass completely through the entire food product. Finally, the shape of the holder permits the bagel to move within the holder, making the bagel more difficult to cut.

SUMMARY OF THE INVENTION

It is therefore a general object of the present invention to provide an improved bagel holder for retaining a bagel in position during slicing.

Another object is to provide an improved bagel holder which will securely hold a bagel in position during slicing.

Another object of the present invention is to provide an improved bagel holder which permits a knife to cut completely through the food product within the holder.

Still another object is to provide an improved bagel holder with specially designed end panels to permit full length vertical slots yet provide a strong integral unit with side walls which are not easily broken.

Yet a further object of the present invention is to provide an improved bagel holder which is economical to manufacture, simple to use, and refined in appearance. These and other objects will be apparent to those skilled in the art.

The bagel holder of the present invention includes a housing with an open upper end and a bottom wall which arches upwardly in its center. Forward and rearward walls of the housing slant towards one another from their upper edges to their lower edges, to form a general wedge shape therebetween. The housing end walls include parallel upper portions and lower portions which slant towards one another as they extend downwardly to their juncture with the bottom wall. Each end wall includes a vertical slot extending downwardly to a lower end spaced above the bottom wall at a point which is a vertical distance approximately the same as the vertical distance to which the bottom wall is arched upwardly. Each end wall includes a thickened portion forming a buttress pad at the lower end of the slots, formed integrally with the end walls.

DESCRIPTION OF THE PREFERRED EMBODIMENTS

Figure 1:
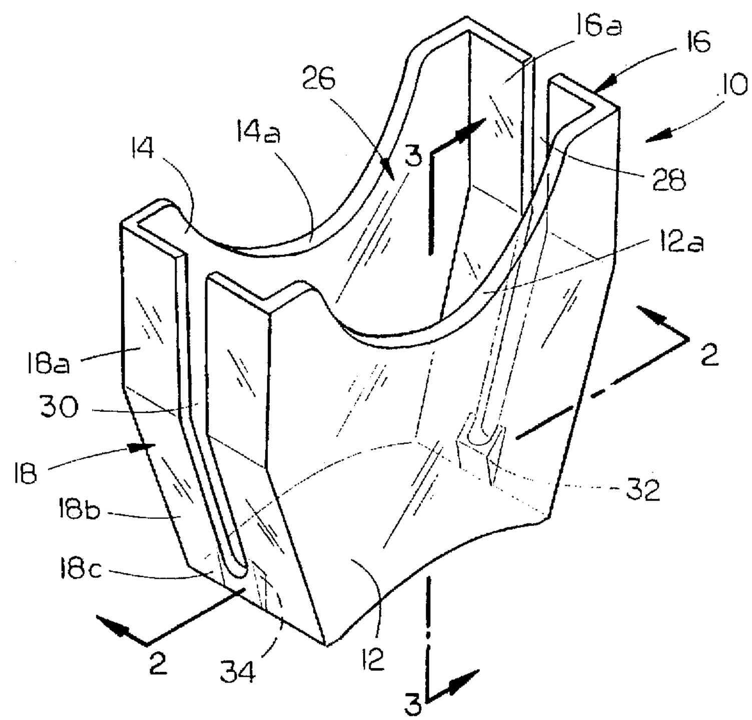
FIG. 1 is a perspective view of the bagel holder of the present invention.

Referring now to the drawings, in which similar or corresponding parts are identified with the same reference numeral, and more particularly to FIG. 1, the bagel holder of the present invention is designated generally at 10 and includes forward and rearward walls 12 and 14 respectively, end walls 16 and 18 respectively, and a bottom wall 20 from which the forward rearward and end walls extend upwardly.

Figure 2:
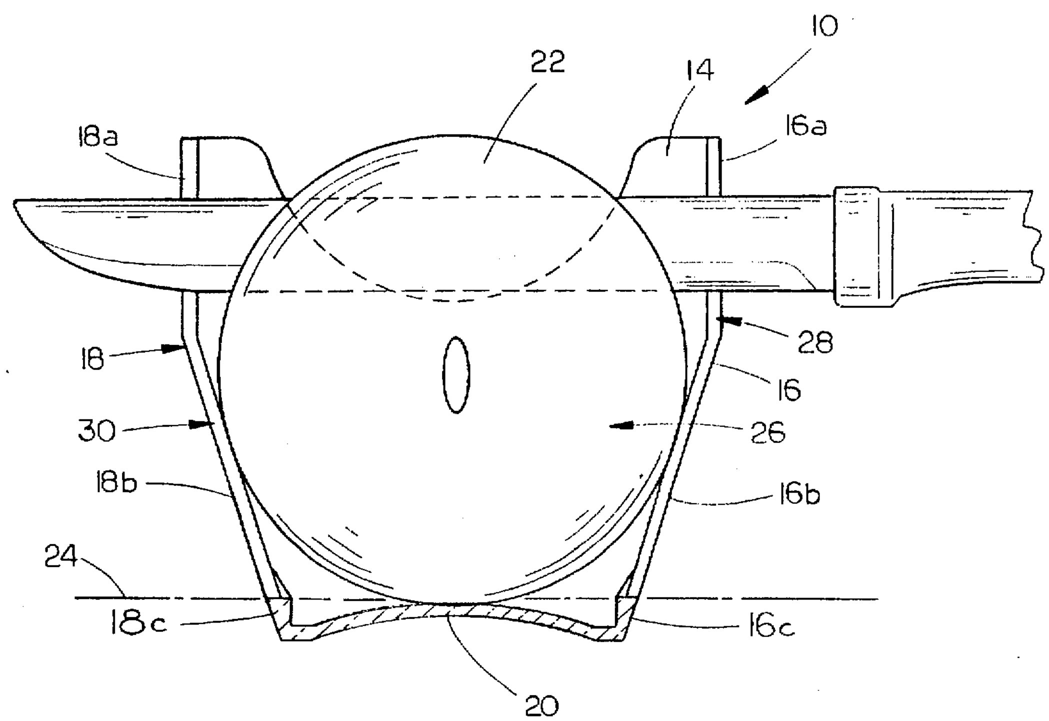
FIG. 2 is a vertical sectional view taken at lines 2—2 in FIG. 1.

Referring now to FIGS. 1 and 2, the upper edges of forward and rearward walls 12 and 14 each have a generally semicircular portion *12a* and *14a* respectively cut out therefrom. As shown in FIG. 2, cut out portions *12a* and *14a* extend downwardly a distance sufficient to permit a bagel 22 to be grasped and removed from holder 10, when resting on bottom wall 20.

As shown in FIG. 2, bottom wall 20 arches upwardly near its center so as to form a generally convex surface within cavity 26 extending from end wall 16 to end wall 18. A generally horizontal plane which passes through a tangent at the apex of curvature of bottom wall 20 is designated at 24 in FIG. 2. It can be seen that bagel 22 will be supported in a vertical orientation with the lower most extent of the bagel in contact with plane 24.

End walls 16 and 18 include generally vertical upper portions *16a* and *18a*, and lower portions *16b* and *18b* which converge towards one another as they extend downwardly from upper portions *16a* and *18a* to bottom wall 20. As shown in FIG. 2, converging lower portions *16b* and *18b* form a general wedge shape in the vertical longitudinal cross-section of the cavity 26 within holder 10.

Figure 3:
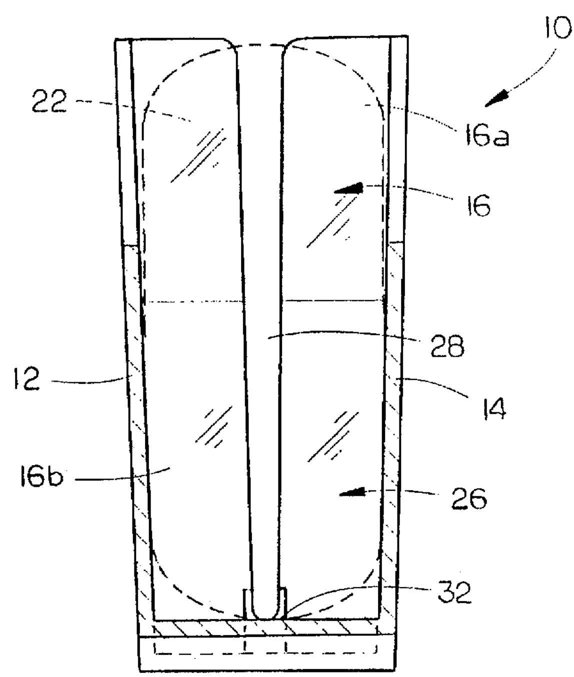
FIG. 3 is a vertical sectional view taken at lines 3—3 in FIG. 1.

FIGS. 1 and 3 show vertical slots 28 and 30 in end walls 16 and 18, respectively, which extend downwardly from an upper edge of end walls 16 and 18, through the entirety of upper portions *16a* and *18a*, and thence downwardly through end wall lower portions *16b* and *18b* to a point above bottom wall 20 generally at plane 24. Slots 28 and 30 are aligned with one another, and located centrally in end walls 16 and 18, so that a knife passing therethrough will cut bagel 22 in half vertically. Because bottom wall 20 is arched upwardly, the knife passing through slots 28 and 30 will pass completely through bagel 22 as the knife contacts bottom wall 20 at plane 24.

As shown in FIG. 2, arched bottom wall 20 also projects upwardly beyond a small ancillary wall portions *16c* and *18c* extending from the lower ends of slots 28 and 30 to bottom wall 20 on end walls 16 and 18. These ancillary wall portions provide additional strength in supporting end walls 16 and 18 rigidly, despite the vertical slots 28 and 30.

Figure 4:
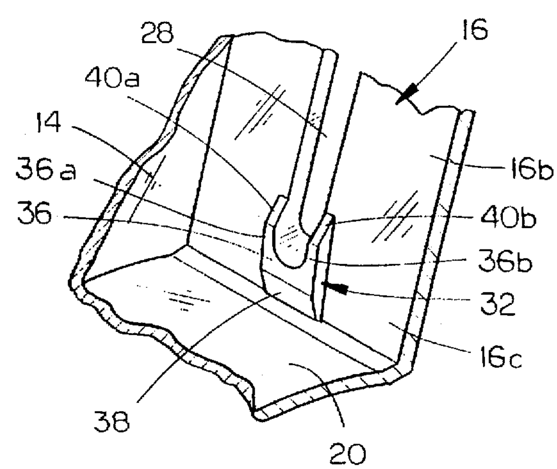
FIG. 4 is an enlarged perspective view of the interior of the holder at the lower end of one vertical slot.

Referring now to FIGS. 2 and 4, a pair of buttress pads 32 and 34 are formed on the interior surface of end walls 16 and 18, respectively, at the lower ends of slots 28 and 30. Buttress pads 32 and 34 are preferably integrally formed with side walls 16 and 18 to form a thicker portion of the end wall at the lower end of the slots. As shown in FIG. 4, buttress pad 32 has a central portion 36 which extends upwardly from just below the lower end of slot 28, and with an arcuate cut out portion corresponding with the lower end of slot 28 to form opposing legs 36*a* and 36*b* extending upwardly on opposite sides of slot 28. A lower portion 38 of buttress pad 32 tapers in thickness as it extends downwardly from central portion 36. Buttress pad 32 also includes a pair of upper portions 40*a* and 40*b* which taper in thickness as they extend upwardly on opposite sides of slot 28 from central portion legs 36*a* and 36*b* respectively.

Buttress pad 34 is identical to buttress pad 32, and therefore will not be described in detail herein. Buttress pads 32 and 34 serve a dual purpose. First, the additional thickness at the lower end of slots 28 and 30 provide a greater surface area to stop the continued passage of a knife cutting through a bagel. Thus, the ancillary wall portions 16*c* and 18*c* of end walls 16 and 18 are less likely to be cut, cracked, or split by repeated contact of the knife at the lower end of slots 28 and 30. In addition, buttress pads 32 and 34 assist in retaining end walls 16 and 18 in rigid position on opposing sides of each vertical slot 28 and 30. In this way, forward and rearward walls 12 and 14 are not easily broken at their lower edges where they connect with bottom wall 20.

Referring now to FIG. 3, the width of the interior cavity 26, as measured between forward and rearward walls 12 and 14, decreases from the upper end to the lower, thereby forming a wedge-shaped vertical transverse cross-section through cavity 26. This wedge-shaped transverse cross-section will more securely hold a bagel 22 which is inserted within cavity 26.

Whereas the invention has been shown and described in connection with the preferred embodiment thereof, many modifications, substitutions and additions may be made which are within the intended broad scope of the appended claims.

I claim:

1. An apparatus for holding a food product for slicing, comprising:

opposing forward and rearward walls projecting generally vertically upwardly from a generally horizontal bottom wall, and opposing end walls projecting generally vertically upwardly from the bottom wall, said forward and rearward walls connected to the end walls to form an enclosed housing with an open upper end;

each said end wall having a vertically oriented slot formed therein extending downwardly from an upper edge of each end wall and generally centered between the forward and rearward walls;

each slot extending downwardly to a lower end spaced above a lower edge of each end wall a predetermined vertical distance;

said bottom wall having opposite end edges connecting the bottom wall to the lower ends of the end walls;

said bottom wall arched upwardly between said end edges to an apex located generally centrally between the end walls; and said bottom wall apex located at a vertical height above the end edges and at least as high as the predetermined vertical distance of the slot lower ends above the end wall lower edges.

2. The apparatus of claim 1, wherein a distance between the forward and rearward walls decreases from an upper edge of the walls to a lower edge of the walls at the bottom wall.

3. The apparatus of claim 2, wherein each said end wall includes an upper portion extending downwardly from the upper edge and a lower portion extending downwardly from a lower end of the upper portion to the lower edge of the end wall, said end wall upper portions being oriented parallel to each other, and a distance between the end wall lower portions decreasing from the lower ends of the upper portions to the end wall lower edges.

4. The apparatus of claim 3, wherein each end wall has a portion of greater thickness defining a buttress pad at the lower end of each slot and extending downwardly to the end wall lower edge.

5. The apparatus of claim 4, wherein each buttress pad includes a pair of legs extending upwardly from the lower end of each respective slot along opposite sides of the respective slot.

6. The apparatus of claim 5, wherein each said forward and rearward wall includes a cut out portion extending downwardly from the upper edge, to permit grasping of a food product located within the housing.

7. The apparatus of claim 6, wherein each cutout is generally semicircular in shape and centered between the end walls.

8. The apparatus of claim 1, wherein each said end wall includes an upper portion extending downwardly from the upper edge and a lower portion extending downwardly from a lower end of the upper portion to the lower edge of the end wall, said end wall upper portions being oriented parallel to each other, and a distance between the end wall lower portions decreasing from the lower ends of the upper portions to the end wall lower edges.

9. The apparatus of claim 8, wherein each end wall has a portion of greater thickness defining a buttress pad at the lower end of each slot and extending downwardly to the end wall lower edge.

10. The apparatus of claim 9, wherein each buttress pad includes a pair of legs extending upwardly from the lower end of each respective slot along opposite sides of the respective slot from the lower end of each slot.

11. The apparatus of claim 1, wherein each end wall has a portion of greater thickness defining a buttress pad at the lower end of each slot and extending downwardly to the end wall lower edge.

12. The apparatus of claim 11, wherein each buttress pad includes a pair of legs extending upwardly from the lower end of each respective slot along opposite sides of the respective slot from the lower end of each slot.

* * * * *